(12) United States Patent  
Roquemore, III

(10) Patent No.: US 10,015,380 B2  
(45) Date of Patent: Jul. 3, 2018

(54) IMAGING SYSTEM

(75) Inventor: John P. Roquemore, III, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 1003 days.

(21) Appl. No.: 12/582,312

(22) Filed: Oct. 20, 2009

(65) Prior Publication Data

US 2010/0157100 A1 Jun. 24, 2010

Related U.S. Application Data

(60) Provisional application No. 61/139,851, filed on Dec. 22, 2008.

(51) Int. Cl.
| | |
|---|---|
| *H04N 5/262* | (2006.01) |
| *H04N 5/225* | (2006.01) |
| *H04N 5/232* | (2006.01) |
| *H04N 5/265* | (2006.01) |

(52) U.S. Cl.  
CPC ....... *H04N 5/2256* (2013.01); *H04N 5/23232* (2013.01); *H04N 5/265* (2013.01)

(58) Field of Classification Search  
CPC .... H04N 5/2355; H04N 9/045; H04N 5/2353; H04N 9/735; G06T 5/50  
USPC .................................................. 348/234, 370  
See application file for complete search history.

(56) References Cited

U.S. PATENT DOCUMENTS

| | | | |
|---|---|---|---|
| 6,062,475 A * | 5/2000 | Feng ....................... | 235/462.06 |
| 6,267,294 B1 * | 7/2001 | Stern .................. | G06K 7/10722 |
| | | | 235/462.41 |
| 6,591,001 B1 * | 7/2003 | Oda et al. .................... | 382/117 |
| 2002/0113882 A1 * | 8/2002 | Pollard et al. ............... | 348/239 |
| 2005/0168625 A1 * | 8/2005 | Fischell et al. .............. | 348/370 |
| 2007/0295814 A1 * | 12/2007 | Tanaka et al. ................ | 235/454 |
| 2008/0232710 A1 * | 9/2008 | Rai .............................. | 382/275 |

* cited by examiner

*Primary Examiner* — Twyler Haskins  
*Assistant Examiner* — Carramah J Quiett  
(74) *Attorney, Agent, or Firm* — Schwegman, Lundberg & Woessner

(57) ABSTRACT

An imaging device comprises a number of light sources, a camera, a processor and a platen. As an object is moved over the platen each of the light sources illuminates the platen sequentially, with the principal axis of illumination of each light source intersecting the plane of the platen at a different place. The camera captures a series of images of the object, each captured image corresponding to the illumination of the platen by a different light source. The processor then generates a composite image from the series of images that compensates for the reflection of light from the platen associated with the principal axis of illumination.

15 Claims, 1 Drawing Sheet

IMAGING SYSTEM

CROSS-REFERENCE TO RELATED APPLICATIONS

The present application claims the benefit of the filing date of Provisional Application Ser. No. 61/139,851, filed Dec. 22, 2008, under the same title.

FIELD OF THE INVENTION

This invention relates to an imaging system. More particularly, but not exclusively, it relates to an imaging system comprising multiple illumination devices. Even more particularly, but not exclusively, it relates to an imaging system for use in a barcode reader.

BACKGROUND TO THE INVENTION

The integration of an illumination device with an imaging device to increase the light available for imaging an object has a number of problems associated with it, particularly in the case of integrating the illumination and imaging devices within a point-of-sale (POS) barcode scanner.

One solution to such an integration is to place the illumination device and the imaging device on opposite sides of a window, or platen. This has the problem that the user, be that the check-out operative or the customer in the case of a POS barcode scanner, is subject to bright lights which may be strobing due to the illumination device operating only when an image is recorded. Such strobing can occur either directly or by reflection from the window. The propensity of strobing lights to bring about epileptic seizures is well known.

An alternative solution to placing the illumination device on opposite sides of the window is to have them placed on the same side of the window with the object to be imaged on the other side. Whilst reducing the likelihood of user dazzle by the illumination device, this arrangement has a number of problems associated with it. Firstly, a proportion of the light emitted from the illumination device is reflected back from the surface of the window and will enter the aperture of the imaging device, such that it saturates the imaging device. This leads to a singularity in the image, associated with the reflection, where no feature of the object is discernable. Accordingly the barcode can be unreadable, causing the object to have to be rescanned.

SUMMARY OF THE INVENTION

According to a first aspect of the present invention there is provided an imaging system comprising:
a plurality of illumination devices;
an image capture device;
a window;
a processor;
each of the plurality of illumination devices being arranged to illuminate the window at a different point;
the image capture device being arranged to capture an image of an object adjacent the window, the object being separated from the image capture device and the plurality of illumination devices by the window;
the processor being arranged to synchronise the activation of each of the plurality of illumination devices sequentially with the capture of a corresponding image of the object by the image capture device; and
the processor being arranged to process the sequentially captured images to produce a composite image of the object, the composite image being composed of at least some elements of at least two of the sequentially captured images.

The processor may be arranged to average the brightness of corresponding pixels within at least two of the sequence of captured images to produce the composite image.

This provides a computationally effective method of producing a composite image, thus speeding up the production of the composite image.

The processor may be arranged to threshold brightness levels of pixels within at least one of the sequence of captured images and to replace pixels having a brightness level in excess of the threshold with corresponding pixels from at least one other of the sequence of captured images to produce the composite image.

This provides a high quality image with high levels of contrast and detail.

The processor may be arranged to threshold average brightness levels of areas within at least one of the sequence of captured images and to replace an area of said captured image having an average brightness level in excess of the threshold with a corresponding area from another of the sequence of captured images to produce the composite image.

This provides a computationally effective method of producing the composite image which increases the speed of production of the image and maintain a low computational load on the processor.

According to a second aspect of the present invention there is provided a barcode scanner comprising the imaging system of the first aspect of the present invention, wherein the imaging system is located internally of the barcode scanner.

According to a third aspect of the present invention there is provided a self-service terminal (SST) comprising the imaging system of the first aspect of the present invention, wherein the imaging system is located internally of the SST.

The SST may comprise an automated teller machine (ATM). The imaging system may comprise an element of a cheque reader module of the ATM.

The SST may comprise any one of the following: an information kiosk, an electronic funds transfer (EFT) terminal, a financial services centre, a bill payment kiosk, a lottery kiosk, a postal services machine, a check-in and/or check-out terminal.

According to a fourth aspect of the present invention there is provided a method of imaging an object separated from an image capture device by a window comprising the steps of:
i) illuminating the object by a first illumination device;
ii) capturing a first image of the object whilst illuminated by the first illumination device;
iii) illuminating the object by a second illumination device, the second illumination device having a different point of incidence with respect to the window than the first illumination device;
iv) capturing a second image of the object whilst illuminated by the second illumination device; and
v) producing a composite image of the object from the first and second images.

The method may comprise inclining at least some of the plurality of illumination devices at differing angles to each other with respect to the window.

The method may comprise averaging the brightness of corresponding pixels within at least two of the sequence of captured images at a processor to produce the composite image.

The method may comprise thresholding brightness levels of pixels within at least one of the sequence of captured images at a processor and to replacing pixels having a brightness level in excess of the threshold with corresponding pixels from at least one other of the sequence of captured images to produce the composite image.

The method may comprise thresholding average brightness levels of areas within at least one of the sequence of captured images at a processor and to replacing an area of said captured image having an average brightness level in excess of the threshold with a corresponding area from another of the sequence of captured images to produce the composite image.

According to a fifth aspect of the present invention there is provided software, which when executed on a processor, causes the processor to:

control a plurality of illumination devices such that each of the plurality of illumination devices is actuated sequentially;

control an image capture device such that an image of an object is captured synchronously with the actuation of each of the illumination devices;

select at least some elements of at least two of the captured images; and form a composite image of the object using the selected elements of the at least two captured images.

The software may cause the processor to average the brightness of corresponding pixels within at least two of the sequence of captured images to produce the composite image.

The software may cause the processor to threshold brightness levels of pixels within at least one of the sequence of captured images and to replace pixels having a brightness level in excess of the threshold with corresponding pixels from at least one other of the sequence of captured images to produce the composite image.

The software may cause the processor to threshold average brightness levels of areas within at least one of the sequence of captured images and to replace an area of said captured image having an average brightness level in excess of the threshold with a corresponding area from another of the sequence of captured images to produce the composite image.

According to a sixth aspect of the present invention there is a data carrier tangibly embodying the software of the fifth aspect of the present invention.

BRIEF DESCRIPTION OF THE DRAWINGS

The invention will now be described, by way of example only, with reference to the accompanying drawings, in which.

DETAILED DESCRIPTION OF EMBODIMENTS OF THE INVENTION

Figure 1:
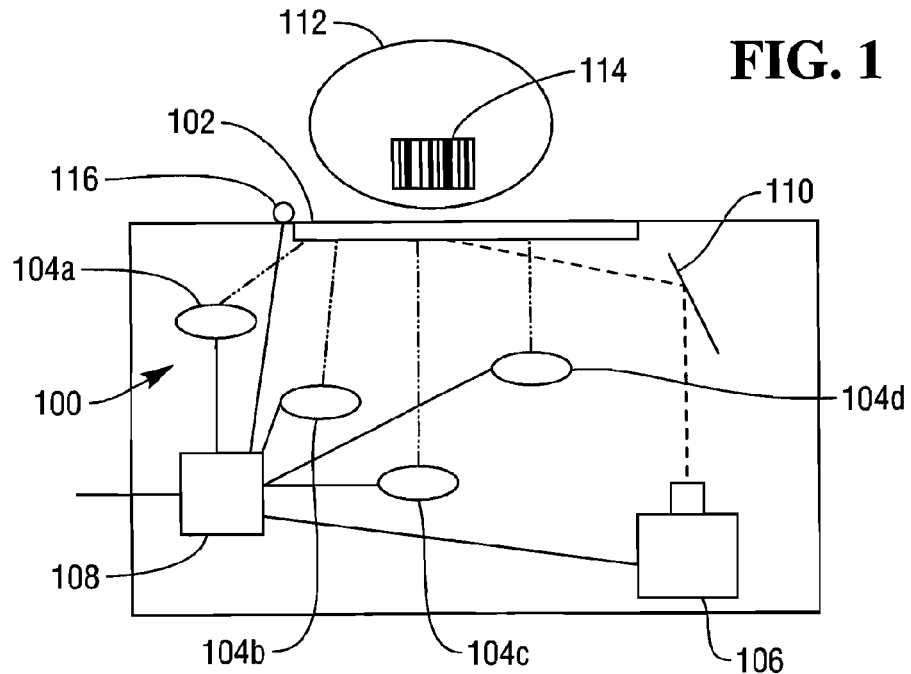
FIG. 1 is a schematic diagram of an embodiment of a barcode scanner comprising an imaging system according to an aspect of the present invention.

Referring now to FIG. 1, an imaging POS barcode scanner 100, comprises a transparent window 102, also known as a platen, a plurality of illumination devices 104, a camera 106, a processor 108 and a mirror 110.

Typically, the illumination devices 104 comprise light emitting diodes (LEDs). Usually LEDs operate in the visible or infra-red parts of the electromagnetic spectrum.

Usually, the camera 106 comprises a complementary metal oxide semiconductor (CMOS) imaging array or a charge coupled device (CCD) imaging array. The camera 106 can comprise either a one dimensional, linear array of sensing elements or two dimensional array of sensing elements dependent upon the application which the scanner 100 is to be applied to.

In some embodiments the mirror 110 increases the optical path between the window 102 and the camera 106 such that the focal plane of the camera 106 extends over substantially all of the window 102. In some embodiments, a single mirror reflect the light emitted from each of the illumination devices 104a-d, whereas in other embodiments each illumination device may have a specific mirror associated with it and in other embodiments, at least some of the illumination devices 104a-d may have no mirror associated with them.

As an object 112 bearing a barcode 114 passes over the window 102 a sensor 116 outputs a signal to the processor 108. In response to the signal from the sensor 116 causes the illumination devices 104a-d to sequentially illuminate the window 102. The processor 108 also controls the camera 106 such that it captures an image of the barcode 114 coincidentally with the illumination of the window 102 by each of the illumination devices 104a-d. Typically, the camera 106 captures the images after a slight delay, typically 5-10 ms, following the activation of the respective illumination devices 104a-d in order to allow similar light levels to be achieved in each of the captured images.

The illumination devices 104 a-d is oriented such that each of their respective axes along which its intensity distribution is a maximum, hereinafter referred to as a principal axis of illumination, strikes the window 102 at a different point. Thus, the reflection at the window 102 of light emitted from each respective illumination device 104a-d due to its respective principal axis of illumination associated lies in a different location in each image of the barcode 114 captured by the camera 106.

The images captured by the camera 106 pass to the processor 108 where they are manipulated to reduce the effects of the reflection of light along the principal axis of illumination from the window 102. A number of manipulation techniques can be used, either separately or in combination, in order to reduce the effects of the aforementioned reflection and a number of exemplary techniques will now be described.

In a first technique, the brightness level of each pixel within each of the captured images is measured. The brightness levels of all corresponding pixels are averaged to yield a composite image comprising the pixels having the average pixel brightness values derived from all of the sequentially captured images. For example in a series of captured images the pixel at x,y in the array has brightness values of 33, 60, 45 and 150 the mean average brightness value associated with this pixel is therefore 71. Other means of averaging the data can be applied, for example the median value of the measured brightness values, or if sufficient images are captured the modal value of the observed brightness values.

A second technique, comprises setting a threshold value for the brightness levels of pixels within a target image, and to replace those pixels where the threshold value is exceed by a corresponding pixel from another of the sequence of images. Typically, the pixel used to replace the pixel having a brightness value that exceeds the threshold will be subject to the threshold test itself, and where it is found to have a brightness value in excess of the threshold value it is itself discarded and a corresponding pixel from another of the sequence of images replaces the pixel in the target image. This process is repeated across all pixels within the image to generate a composite image having a brightness level within in acceptable range. Typically, all of the characteristics of the replacement pixel are imported into the target image to generate the composite image. For example, a threshold level may be set at 180 in an 8-bit 256 level scale, the pixel at x, y in the target image has a brightness level of 195, the corresponding pixel at x,y in the next image in the recorded sequence has a brightness level of 140 and is chosen to replace the target image pixel in the composite image.

A third technique comprises grouping pixels within each of the sequence of images into areas, for example 10 pixels by 10 pixels, averaging brightness values within these areas and then subjecting these area averaged pixel brightness values to the threshold and replacement technique described with reference to the second technique hereinbefore.

A fourth technique comprises grouping pixels within each of the sequence of images into areas, for example 10 pixels by 10 pixels, averaging brightness values within these areas and then subjecting these area average pixel brightness values to the inter-image averaging technique described with reference to the first technique hereinbefore.

The processor 108 analyses the composite image generated by the manipulation of the image to determine the barcode on the item and communicate the barcode to a point of sale (POS) terminal in a manner known to those skilled in the art.

It is envisaged that in some embodiments the processor 108 will run optical character recognition (OCR) software to enable it to read text as well as the barcode 114.

Figure 2:
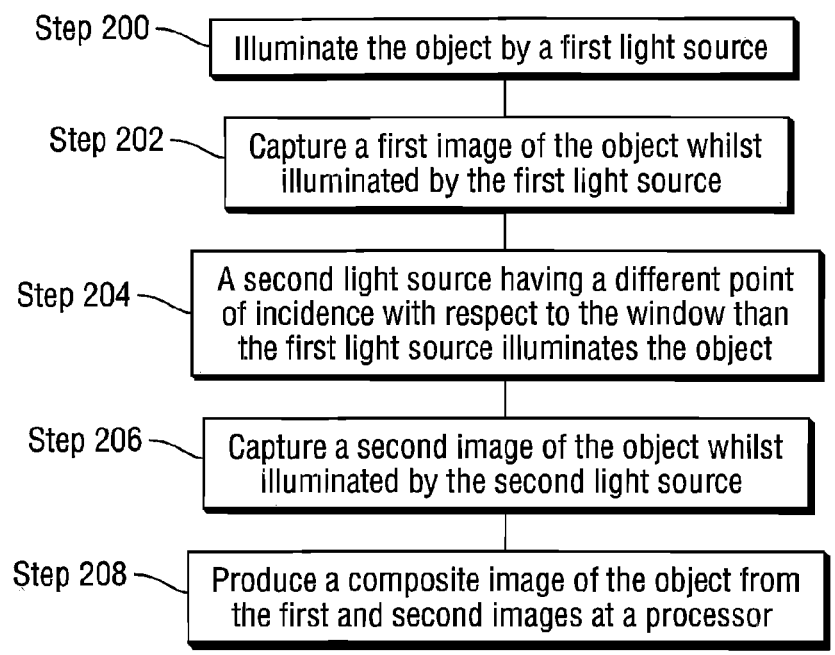
FIG. 2 is a flowchart detailing the steps of a method of imaging an object separated from an image capture device by a window according to an aspect of the present invention.

Referring now to FIG. 2, a method of imaging an object separated from an image capture device by a window comprises illuminating the object by a first light source (Step 200). A camera captures a first image of the object whilst illuminated by the first light source (Step 202). A second light source having a different point of incidence with respect to the window than the first light source illuminates the object (Step 204). The camera captures a second image of the object whilst illuminated by the second light source (Step 206). A processor produces a composite image of the object from the first and second images. (Step 208).

It will be appreciated that although described with reference to four illumination devices the present invention can be implemented with two or more illumination devices.

It will be appreciated that although described with reference to a POS barcode scanner the present invention is applicable to any suitable self-service terminal (SST) or network of SSTs. Examples of suitable SSTs include, but are not limited to, an automated teller machine (ATM), an information kiosk, an electronic funds transfer (EFT) terminal a financial services centre, a bill payment kiosk, a lottery kiosk, a postal services machine, a check-in and/or check-out terminal such as those used in the retail, hotel, car rental, gaming, healthcare, and airline industries, or the like.

As described herein the SST comprises one or more modules each of which is operable to perform at least one specific function. Typically, the module implements its function either in response to a customer action and/or a command received from a PC core (which is also a module) of the SST. Non-limiting examples of modules include: display, journal printer, operator panel, encrypting keypad, PC core, etc.

Typically, each module comprises a processor to enable the module to perform its function, and a communications facility to enable the module to communicate with the controller, but in some instances this may not be essential.

Each module comprises one or more devices that contributes to the execution of the module's respective function. Typically, each device comprises a replaceable part within the module. Non-limiting examples of devices include: for the display module, a display panel, a display panel housing, and the like.

Each device comprises one or more components configured to enable the device to contribute to the execution of the module's function.

It will also be appreciated that the steps of the methods described herein may be carried out in order suitable to effect the present invention, or simultaneously where appropriate. The methods described herein may be performed by software in machine readable form on a tangible storage medium or as a propagating signal.

Various modifications may be made to the above described embodiment without departing from the spirit and the scope of the invention.

The invention claimed is:

1. An imaging system comprising:
   a plurality of illumination devices;
   a mirror;
   an image capture device;
   a window;
   a processor;
   each of the plurality of illumination devices being arranged to illuminate the window at a different point, and wherein each illumination device is oriented within the imaging system for providing that illumination device's maximum light intensity to strike the window at a particular point that is different points along the window from remaining ones of the illumination devices, each illumination device achieves maximum light intensity along that illumination device's principal axis of illumination, and where the plurality of illumination devices include four illumination devices;
   the image capture device being arranged to capture an image of an object adjacent the window through the mirror, the object being separated from the image capture device and the plurality of illumination devices by the window;
   the processor being arranged to synchronize the activation of each of the plurality of illumination devices by sequentially activating each illumination device with a delay interval between an illumination of a next illumination device of 5-10 milliseconds with the capture of a corresponding image of the object by the image capture device through the mirror and for each sequentially activated illumination device and to receive a plurality of sequentially captured images following the sequential activation of each illumination device that includes pixel data received from the sequentially captured images, wherein each of the plurality of illumination devices when activated illuminate a different location in the object for that illumination device's sequentially captured image; and
   the processor being arranged to process the pixel data in a first image of the plurality of sequentially captured images and the pixel data in a second image of the plurality of sequentially captured images to produce a composite image of the object, wherein the composite image has a pixel composition which is based upon (i) at least some of the pixel data in the first image, and (ii) at least some of the pixel data in the second image.

2. The system of claim 1, wherein the pixel composition of the composite image comprises the average of the brightness levels of each corresponding pixel within at least the first and second images of the plurality of sequentially captured images.

3. The system of claim 1, wherein (i) the pixel composition of the composite image comprises at least some original pixels from the first image and at least some original pixels from the second image, (ii) the brightness levels of the at least some original pixels from the first image are not in excess of a threshold value, (iii) the brightness levels of the at least some original pixels from the second image are not in excess of the threshold value, and (iv) the at least some original pixels from the second image are replacement pixels for corresponding pixels of the first image having brightness levels in excess of the threshold value.

4. The system of claim 1, wherein (i) the pixel composition of the composite image comprises at least some original pixel areas from the first image and at least some original pixel areas from the second image, (ii) the average brightness levels of each of the at least some original pixel areas from the first image are not in excess of a threshold value, (iii) the average brightness levels of each of the at least some original pixel areas from the second image are not in excess of the threshold value, and (iv) the at least some original pixel areas from the second image are replacement pixel areas for corresponding pixel areas of the first image having average brightness levels in excess of the threshold value.

5. A barcode scanner comprising the imaging system of claim 1, wherein the imaging system is located internally of the barcode scanner.

6. A self-service terminal (SST) comprising the imaging system of claim 1, wherein the imaging system is located internally of the SST.

7. The SST of claim 6, wherein the SST comprises any one of the following: an automated teller machine (ATM), an information kiosk, an electronic funds transfer (EFT) terminal, a financial services centre, a bill payment kiosk, a lottery kiosk, a postal services machine, a check-in and/or check-out terminal.

8. A method of imaging an object separated from an image capture device by a window comprising:
  activating a first illumination device to illuminate the object by a processor, wherein activating further includes illuminating a first portion of the object at a first maximum light intensity capable of being provided by the first illumination device by orienting the first illumination device along that first illumination device's principal axis of illumination to strike a first unique portion of the window with the first maximum light intensity;
  receiving from the image capture device a first image of the object taken during illumination of the object after a delay interval of 5-10 milliseconds by the first illumination device including first pixel data by the processor, the first pixel data representing the first portion of the object that the first illumination device illuminated, wherein the image capture device receives the first image from a mirror directed to the first portion;
  activating a second illumination device, after the delay interface, the second illumination device having a different point of incidence with respect to the window than the first illumination device to illuminate the object by the processor wherein activating further includes illuminating a second portion of the object at a second maximum light intensity capable of being provided by the second illumination device by orienting the second illumination device along that second illumination device's principal axis of illumination to strike a second unique portion of the window with the second maximum light intensity;
  receiving from the image capture device a second image of the object taken during illumination of the object by the second illumination device including second pixel data by the processor, wherein the first image is for a different illuminated location in the object from that which is associated with the second image, and wherein the second pixel data representing the second portion of the object that the second illumination device illuminated, and the second portion is different from the first portion illuminated by the first illumination device, wherein the image capture device receives the second image through the mirror directed to the second portion; and
  producing a composite image of the object, wherein the composite image has a pixel composition which is based upon calculated statistical values associated with at least some of the first pixel data of the first image and at least some of the second pixel data of the second image by the processor.

9. The method of claim 8, wherein each of the calculated statistical values associated with the at least some of the first pixel data of the first image and the at least some of the second pixel data of the second image comprises an average value of the brightness levels of each corresponding pixel within at least the first and second images.

10. The method of claim 8, wherein each of the calculated statistical values associated with the at least some of the first pixel data of the first image and the at least some of the second pixel data of the second image comprises a median value of the brightness levels of each corresponding pixel within at least the first and second images.

11. The method of claim 8, wherein each of the calculated statistical values associated with the at least some of the first pixel data of the first image and the at least some of the second pixel data of the second image comprises a modal value of the brightness levels of each corresponding pixel within at least the first and second images.

12. The method of claim 8, wherein the method is performed by a computer having a memory executing one or more programs of instructions which are tangibly embodied in a program storage medium readable by the computer.

13. A method of imaging an object separated from an image capture device by a window comprising:
  activating a first illumination device to illuminate the object by a processor, wherein activating further includes illuminating a first portion of the object at a first maximum light intensity capable of being provided by the first illumination device by orienting the first illumination device along the first illumination device's principal axis of illumination to strike the window at a first unique portion with the first maximum light intensity;
  receiving from the image capture device a first image of the object taken during illumination of the object after a delay interval of 5-10 milliseconds by the first illumination device including first pixel data by the processor, wherein the first pixel data representing the first portion of the object, wherein the image capture device receives the first image through a mirror directed to the first portion;
  activating a second illumination device, after the delay interval, the second illumination device having a different point of incidence with respect to the window than the first illumination device to illuminate the object by the processor, wherein activating further includes illuminating a second portion of the object at a second maximum light intensity capable of being provided by the second illumination device by orienting the second illumination device along the second illumination device's principal axis of illumination to strike the window at a second unique portion with the second maximum light intensity;

receiving from the image capture device a second image of the object taken during illumination of the object by the second illumination device including second pixel data by the processor, wherein the first image is for a different location in the object from that which is associated with the second image, and wherein the second pixel data representing the second portion of the object illuminated by the second illumination device, and the second portion is different from the first portion, wherein the image capture device receives the second image through the mirror directed to the second portion; and producing a composite image of the object, wherein the composite image has a pixel composition which is based upon (i) comparison of brightness levels of the first pixel data to a threshold value, and (ii) replacement of at least some pixel data of the first pixel data having brightness levels in excess of the threshold value with corresponding second pixel data having brightness levels not in excess of the threshold value.

14. The method of claim 13, wherein the pixel composition of the composite image is based upon (i) comparison of average brightness levels of pixel data within first areas of the first image, and (ii) replacement of pixel data within at least some of the first areas having average brightness levels in excess of the threshold with pixel data from corresponding second areas of the second image having average brightness levels not in excess of the threshold value.

15. The method of claim 14, wherein the method is performed by a computer having a memory executing one or more programs of instructions which are tangibly embodied in a program storage medium readable by the computer.

* * * * *